(12) United States Patent
Lee et al.

(10) Patent No.: US 9,219,608 B2
(45) Date of Patent: Dec. 22, 2015

(54) APPARATUS AND METHOD FOR SHARING CONTENTS OF SOCIAL NETWORK SERVICE IN COMMUNICATION SYSTEM

(75) Inventors: Jeong-Soo Lee, Suwon-si (KR); Hong-Gee Kim, Seoul (KR); Sang-Won Yang, Seoul (KR); Seung-Jae Song, Seoul (KR); Jin-Hyun Ahn, Incheon (KR); James G. Kim, Seoul (KR)

(73) Assignees: Samsung Electronics, Co., Ltd, Suwon-si (KR); SNU R&DB Foundation, Seoul (KR)

( * ) Notice: Subject to any disclaimer, the term of this patent is extended or adjusted under 35 U.S.C. 154(b) by 648 days.

(21) Appl. No.: 13/204,224

(22) Filed: Aug. 5, 2011

(65) Prior Publication Data

US 2012/0227089 A1    Sep. 6, 2012

(30) Foreign Application Priority Data

Mar. 3, 2011  (KR) .......................... 10-2011-0018840

(51) Int. Cl.
*H04L 9/32* (2006.01)
*G06F 15/16* (2006.01)
*H04L 29/06* (2006.01)

(52) U.S. Cl.
CPC ............ *H04L 9/3213* (2013.01); *H04L 9/3234* (2013.01); *H04L 63/10* (2013.01)

(58) Field of Classification Search
CPC ...... H04L 63/10; H04L 9/3213; H04L 9/3234
See application file for complete search history.

(56) References Cited

U.S. PATENT DOCUMENTS

| 8,090,666 | B2 * | 1/2012 | Sarbaev et al. | 705/319 |
| 8,214,883 | B2 * | 7/2012 | Obasanjo et al. | 726/4 |
| 8,312,276 | B2 * | 11/2012 | Chiou et al. | 713/171 |
| 8,370,895 | B2 * | 2/2013 | DiCrescenzo et al. | 726/1 |
| 8,612,359 | B2 * | 12/2013 | Hull et al. | 705/319 |
| 8,769,259 | B2 * | 7/2014 | Broustis et al. | 713/152 |
| 8,898,730 | B1 * | 11/2014 | Fredinburg et al. | 726/1 |
| 8,955,153 | B2 * | 2/2015 | Altaf et al. | 726/28 |

(Continued)

FOREIGN PATENT DOCUMENTS

| KR | 10-2008-0099388 | 11/2008 |
| KR | 10-2009-0072575 | 7/2009 |

(Continued)

OTHER PUBLICATIONS

Tootoonchian, "Lockr: Social Access Control for Web 2.0, Department of Computer Science," University of Toronto, and Microsoft Research, Aug. 18, 2008, pp. 1-6.*

(Continued)

*Primary Examiner* — Kaveh Abrishamkar
*Assistant Examiner* — James J Wilcox

(57) ABSTRACT

A system, apparatus, and method in a communication system allow sharing contents of users by acquiring an access right even if there is no connection relationship in a Social Network Service (SNS). The system includes an SNS provider and a middleware server. The SNS provider provides the SNS and generates an authorization key and an authorization token according to an open authorization protocol. The middleware server obtains contents of a second user from the SNS provider by using an authorization key of the second user when a first user requests sharing SNS contents of the second user, and transmits the contents of the second user to the first user.

29 Claims, 11 Drawing Sheets

(56) References Cited

U.S. PATENT DOCUMENTS

| | | | |
|---|---|---|---|
| 9,009,229 B2* | 4/2015 | Savir et al. | 709/204 |
| 9,083,763 B2* | 7/2015 | Rao et al. | 1/1 |
| 2010/0114614 A1* | 5/2010 | Sharpe | 705/5 |
| 2010/0241716 A1* | 9/2010 | Akadiri | 709/206 |
| 2010/0333019 A1* | 12/2010 | Oschwald et al. | 715/810 |
| 2011/0035503 A1* | 2/2011 | Zaid et al. | 709/228 |
| 2011/0069661 A1* | 3/2011 | Waytena et al. | 370/328 |
| 2012/0102566 A1* | 4/2012 | Vrancken et al. | 726/20 |
| 2012/0210448 A1* | 8/2012 | Vrancken et al. | 726/29 |
| 2013/0036455 A1* | 2/2013 | Bodi et al. | 726/4 |
| 2014/0033278 A1* | 1/2014 | Nimashakavi et al. | 726/4 |
| 2014/0033279 A1* | 1/2014 | Nimashakavi et al. | 726/4 |
| 2014/0033280 A1* | 1/2014 | Nimashakavi et al. | 726/4 |

FOREIGN PATENT DOCUMENTS

| | | |
|---|---|---|
| WO | WO 2007076074 A3 * | 4/2008 |
| WO | WO 2008/131452 A1 | 10/2008 |

OTHER PUBLICATIONS

Mark, "OAuth Negotiation for Dummies," Sep. 23, 2009, pp. 1-3, retrieved from https://web.archive.org/web/20090923011013/http://marktrapp.com/blog/2009/09/17/oauth-dummies.*

Oracle et al, "Oracle Fusion Middleware, Concepts Guide," 11g Release (11.1.1) E10103-07, Jul. 2010, pp. 1-80.*

Vrancken, "Using OAuth for Recursive Delegation," Alcatel Lucent, Sep. 2009, pp. 1-11.*

* cited by examiner

APPARATUS AND METHOD FOR SHARING CONTENTS OF SOCIAL NETWORK SERVICE IN COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 3, 2011 and assigned Serial No. 10-2011-0018840, the entire disclosure of which is hereby incorporated by reference.

TECHNICAL FIELD OF THE INVENTION

The present invention relates to a technique for reading online Social Network Service (SNS) contents by sharing the SNS contents in a portable terminal. More particularly, the present invention relates to an apparatus and method for exchanging SNS contents and portable terminal contents between users by acquiring/transmitting a middleware-based access right in the portable terminal.

BACKGROUND OF THE INVENTION

Online Social Network Service (SNS) contents are received from a different user in a portable terminal as follows. When a user of the portable terminal inputs account information of an online SNS, the contents of the different user are received from the online SNS, and the portable terminal displays the contents on a screen. That is, the process of receiving the SNS contents includes obtaining an access right for the contents of the different user by using user account information, requesting latest contents of the different user, and displaying the contents on a screen of the portable terminal according to a response.

As described above, the access right is required to receive the contents of the different user. Therefore, if there is no connection relationship in the SNS, the user cannot have the access right for the online SNS contents of the different user and thus cannot read the contents. In other words, if there is no connection relationship in the SNS, the user cannot read the contents even if the different user intends to provide the contents.

SUMMARY OF THE INVENTION

To address the above-discussed deficiencies of the prior art, it is a primary aspect of the present invention to provide an apparatus and method for sharing contents by acquiring an access right according to an offline connection relationship even if there is no connection relationship in a Social Network Service (SNS) in a communication system.

Another aspect of the present invention is to provide an apparatus and method for acquiring authorization on SNS contents by using an open authorization protocol in a communication system.

In accordance with an aspect of the present invention, a communication system supporting a Social Network Service (SNS) is provided. The system includes an SNS provider and a middleware server. The SNS provider provides the SNS and generates an authorization key and an authorization token according to an open authorization protocol. The middleware server obtains contents of a second user from the SNS provider by using an authorization key of the second user when a first user requests sharing SNS contents of the second user and transmits the contents of the second user to the first user.

In accordance with another aspect of the present invention, a method for operating a middleware server in a communication system supporting a Social Network Service (SNS) is provided. An authorization key of a second user is determined according to an open authorization protocol when a request to share SNS contents of the second user is received from the first user. The contents of the second user is obtained from an SNS provider by using the authorization key of the second user. And the contents of the second user are transmitted to the first user.

In accordance with another aspect of the present invention, a method of operating a Social Network Service (SNS) provider in a communication system supporting an SNS is provided. An authorization key for a user is generated according to an open authorization protocol when registering a user account. The authorization token for reading contents of the user is provided when a request for the authorization token comprising the authorization key of the user is received from a middleware server. And the contents of the user are provided when a request to read the contents of the user comprising the authorization token is received.

In accordance with another aspect of the present invention, a method of operating a portable terminal in a communication system supporting a Social Network Service (SNS) is provided. An authorization key of a user for the SNS is generated according to an open authorization protocol when an account for the user is registered to the SNS. The authorization key of the user is provided to a middleware server. And when a request to share contents of the user is received, a screen for inquiring user about whether the sharing of the contents is accepted is displayed.

In accordance with another aspect of the present invention, a middleware server apparatus in a communication system supporting a Social Network Service (SNS) is provided. The apparatus includes a controller and a communication unit. The controller determines an authorization key of a second user according to an open authorization protocol when a request to share SNS contents of the second user is received from a first user, and obtains the contents of the second user from an SNS provider by using the authorization key of the second user. The communication unit transmits the contents of the second user to the first user.

In accordance with another aspect of the present invention, a Social Network Service (SNS) provider apparatus in a communication system supporting an SNS is provided. The apparatus includes a controller and a communication unit. The controller generates an authorization key for a user according to an open authorization protocol when registering a user account. The communication unit provides the authorization token for reading contents of the user when a request for the authorization token comprising the authorization key is received from a middleware server, and provides the contents of the user when a request to read the contents of the user comprising the authorization token is received.

In accordance with another aspect of the present invention, a portable terminal apparatus in a communication system supporting a Social Network Service (SNS) is provided. The apparatus includes a controller, a communication unit, and a display unit. The controller generates an authorization key of a user for the SNS according to an open authorization protocol when an account for the user is registered to the SNS. The communication unit provides the authorization key of the user to a middleware server. And the display unit displays a screen for inquiring the user about whether sharing of contents of the user is accepted when a request to share the contents of the user is received.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention described hereinafter relates to a technique for sharing Social Network Service (SNS) contents between users in a portable terminal.

Figure 1:
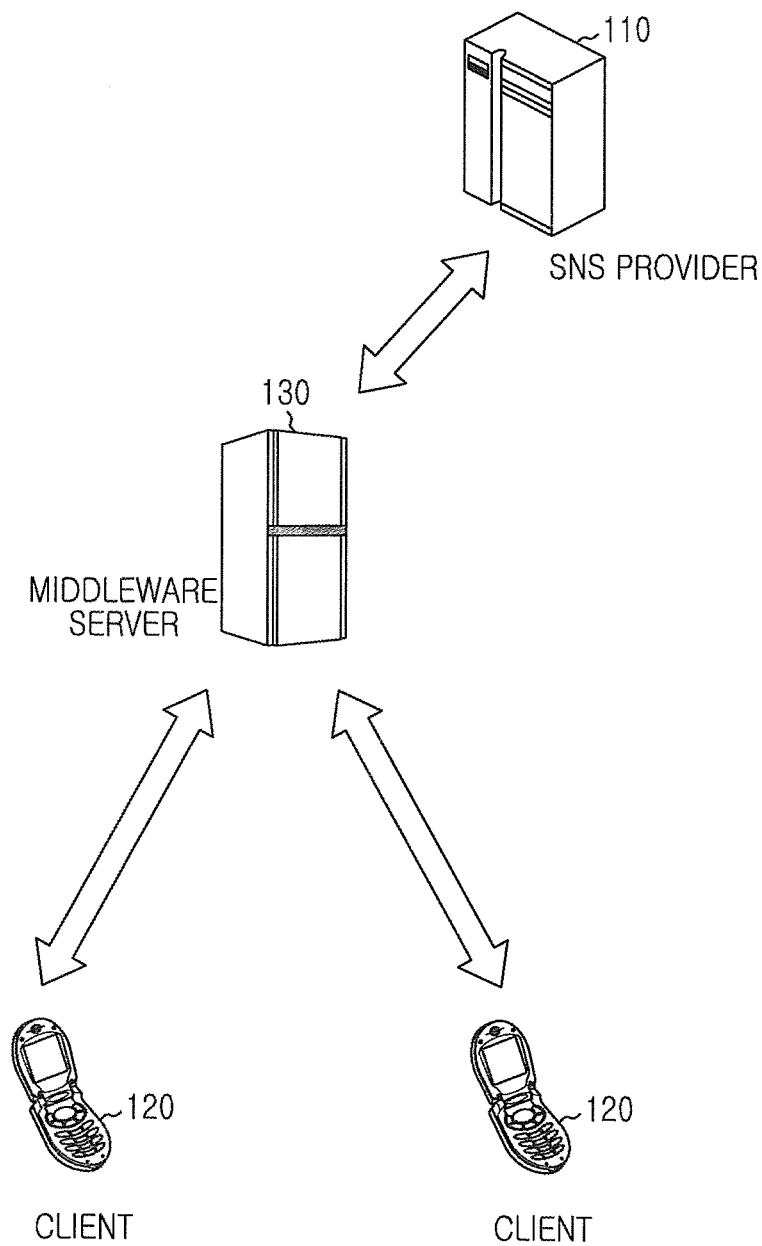
FIG. 1 illustrates a structure of a communication system according to an embodiment of the present invention.

FIG. 1 illustrates a structure of a communication system according to an embodiment of the present invention.

Referring to FIG. 1, the system includes an SNS provider 110, a client 120, and a middleware server 130.

The SNS provider 110 provides an SNS through a network. Examples of the SNS provided by the SNS provider 110 may include at least one of Facebook, Twitter, and Cyworld. The SNS provider 110 stores SNS contents uploaded by the client 120. In addition, the SNS provider 110 stores information on connection relationships between SNS subscribers. The connection relationship is determined by the subscribers in the SNS, and a specific right is given to the subscribers. For example, the subscribers can share specific contents only with other subscribers with the connection relationship. For example, the connection relationship is called 'following/follower' in Twitter, 'the first degree of kinship' in Cyworld, and 'friend' in Facebook.

The client 120 is a system which is driven in the portable terminal of the user. For example, the client 120 may include computer programs which run in an operating system based on a smart phone. In addition, the client 120 includes a portable terminal application that can be downloaded and purchased from an online shop that provides the portable terminal application.

The middleware server 130 executes a server program for transmitting and receiving a Hypertext Transfer Protocol (HTTP) message, and can be constructed with a general-purpose computer or a server computer. The middleware server 130 can be driven by a centralized server program, and stores information on a plurality of client systems including the client 120. Information on the client 120 may include information on the user, or may include hardware information of the portable terminal.

The client 120 can determine information on the middleware server 130. The information on the middleware server 130 may include an Internet Protocol (IP) address of the middleware server 130, account information (e.g., a user Identifier (ID) and a password) for the middleware server 130 of the user, an Open Authorization (OAuth) key an OAuth token for the SNS of each user, and such. In addition, the middleware server 130 collects contents from a corresponding SNS by using the OAuth token to request for contents of the user, and temporarily stores the contents. In addition, the middleware server 130 collects the contents from the portable terminal of the user at the request for contents of the user, and temporarily stores the contents. The temporarily stored contents can be deleted after being delivered to the user who has requested the contents.

The contents considered in the present invention include files (i.e., music, video, pictures, texts, and such) stored in the portable terminal or the server computer of the SNS. In addition, the contents may include tag information. Tag information implies a word, OAuth is an example of an open authorization protocol based on HTTP. The OAuth can be replaced with another type of open authorization protocol according to an embodiment of the present invention.

(1) Management of OAuth Key and OAuth Token in Middleware Server

Figure 2:
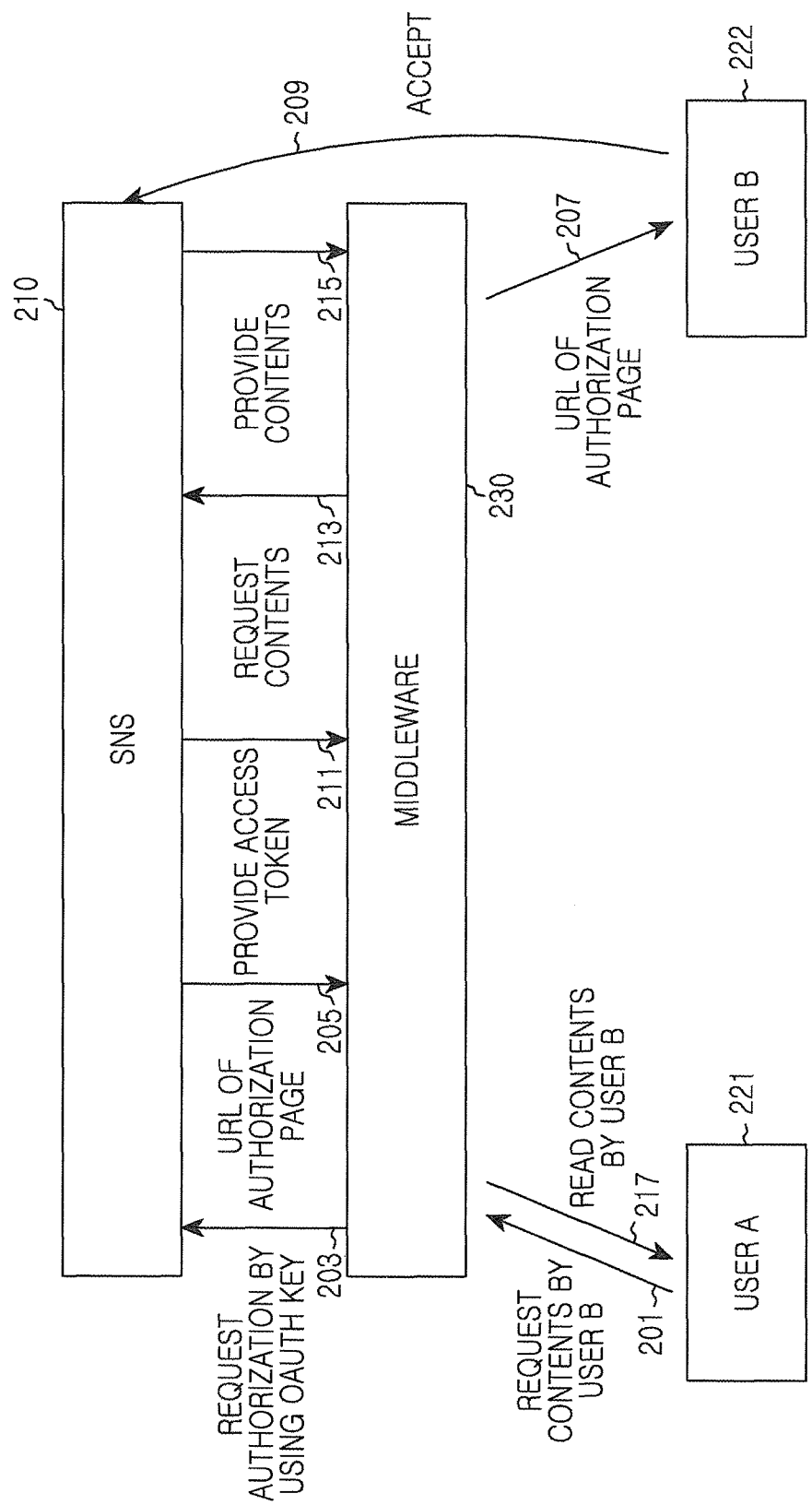
FIG. 2 illustrates a process of managing authorization information in a communication system according to an embodiment of the present invention.

A process of managing the OAuth key and the OAuth token in the middleware server is illustrated in FIG. 2. FIG. 2 illustrates a process of managing authorization information in a communication system according to an embodiment of the present invention. That is, FIG. 2 illustrates a process in which the middleware server obtains the OAuth token of a user and shares contents. It is assumed in the present invention that a user A 221 and a user B 222 register their accounts to an SNS 210, and the SNS 210 stores contents uploaded by the user A 221 and the user B 222.

Referring to FIG. 2, in step 201, the user A 221 requests a middleware 230 to transmit contents of the user B 222 in order to read SNS contents of the user B 222. Accordingly, in step 203, the middleware 230 requests the SNS 210 to transmit an OAuth token for the SNS contents by using an OAuth key of the user B 222. The middleware 230 can obtain in advance the OAuth keys of the users. For example, in order to share an access right on contents, the user A 221 and the user B 222 can generate the OAuth keys in the SNS 210, and can provide the OAuth keys to the middleware 230.

In step 205, according to an OAuth protocol, the SNS 210 generates a temporary authorization web page to inquire the user B 222 about whether a request on contents is accepted, and provides a Uniform Resource Locator (URL) of the temporary authorization web page to the middleware 230. The temporary authorization web page can be read after the user B 222 logs in.

In step 207, the middleware 230 transmits the URL of the temporary authorization web page to the portable terminal of the user B 222. The portable terminal announces message arrival to the user B 222, and the user B 222 determines whether to accept or reject the message. If the message is accepted, the portable terminal internally performs the login process, and then reads the temporary authorization web page. Otherwise, if the message is rejected, the portable terminal does not read the temporary authorization web page. The reading of the temporary authorization web page implies that the user B 222 transmits an indication for accepting the message. That is, in step 209, the user B 222 transmits the indication of accepting the message to the SNS 210.

When the temporary authorization web page is read, proceeding to step 211, the SNS 210 generates an OAuth token for reading the requested contents, and transmits the OAuth token to the middleware 230. Accordingly, in step 213, the middleware 230 provides the OAuth token and requests the reading of the contents. In step 215, the SNS 210 evaluates a right on the reading of the contents by using the OAuth token, and provides the contents to the middleware 230. In step 217, the middleware 230 transmits the contents to the user A 221. In this situation, the middleware 230 can store the OAuth token and the contents such that they can be reused at a later time.

Because the OAuth token is used as described above, even if the user A 221 and the user B 222 do not have a connection relationship in the SNS 210, it is possible to share contents that normally can only be read under the condition that there is a connection relationship in the SNS. Furthermore, through the aforementioned process, another user, not shown, whose account is not registered to the SNS 210 can read the contents of the user A 221 and the user B 222 via the middleware 230.

(2) Management of Access to Middleware Server

According to the aforementioned description, users who have no connection relationship in the SNS can share contents by using the OAuth key and the OAuth token via the middleware. However, because the aforementioned contents sharing method is related to a security problem of contents, a method of controlling a right of using the middleware is required. A user generates an account for a usage right on the middleware server. For example, if a client has a button for requesting generation of an account for the middleware server and the user clicks the button, a screen for inputting a user ID and a password is displayed. When account information (i.e., the user ID, the password, and such) is generated through the screen, the account information is stored in the middleware server and the portable terminal of the user. Thereafter, if the user operates the client, the client automatically logs in the middleware server by using the stored account information. Herein, the log-in process implies announcing of user information to the middleware server. The user information may include at least one of an IP address of the portable terminal and SNS account information of the user.

(3) Method of Operating Client—Acquisition of SNS Contents of Different User

A client basically has an address management function. When a user operates the client in a portable terminal, a list of different users registered in advance by the user is displayed on a screen. The list of the different users implies enumeration of indication information (e.g., name) of the different users. The list of the different users and profile information of each user are stored in a storage unit of the portable terminal, and are displayed on the screen when the client operates. The profile information may include at least one of a name, a phone number, middleware server account information, and an SNS account name. The SNS account information can express a specific connection relationship between the user and the different users. The user can input the profile information, and the input information is stored in the storage unit of the portable terminal. In the profile information, the remaining parts other than the phone number can be provided from the middleware server even if the user does not input the information explicitly. That is, the user may input only a phone number of an acquaintance, and the remaining information may be provided from the middleware server.

When the user selects a specific user from the list of the different users, profile information of the selected user and contents collected from the SNS or the portable terminal are displayed on the screen. In addition, a button for updating the contents is displayed on the screen. When the user clicks the button for updating the contents, the client transmits a message for requesting the contents to the middleware server by using the stored IP address of the middleware server. The middleware server transmits the message for requesting the contents to an SNS provider, to which a target user of the request is registered, in order to address the request of the client. When transmitted to the SNS provider, the message for requesting the contents preferably uses a programming Application Program Interface (API) which is reported by the SNS provider. In the process of requesting the contents to the SNS provider, the middleware server uses the previously obtained OAuth token. The middleware server collects contents, and temporarily stores the contents into a database. When the contents are completely collected from the SNS provider, the middleware server transmits the contents to the client that has requested the contents.

Figure 3:
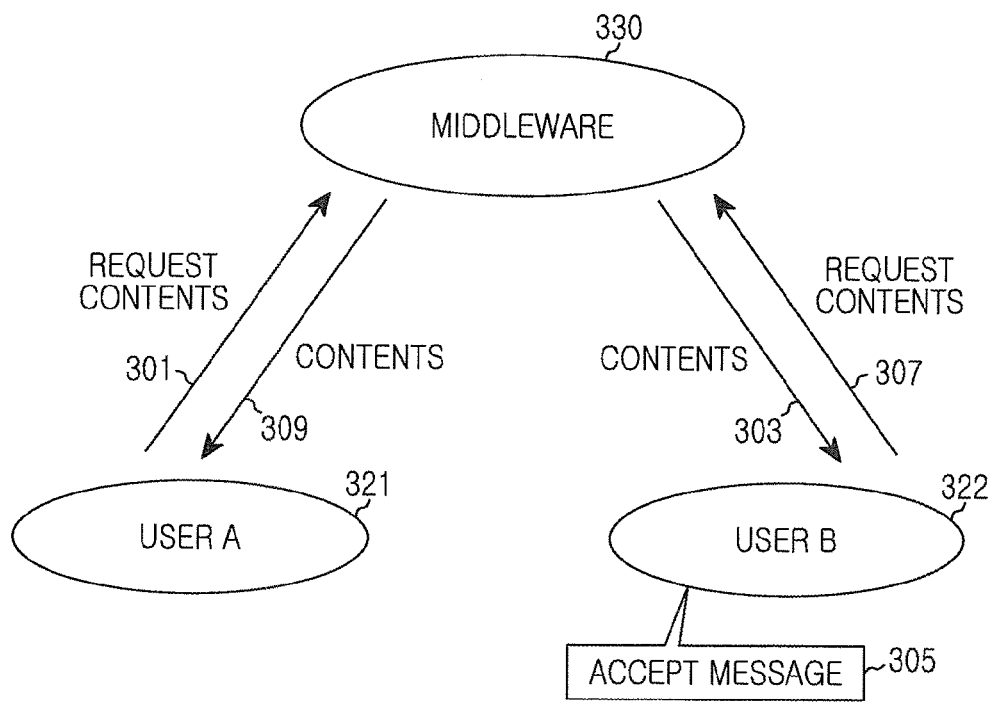
FIG. 3 illustrates a process of sharing contents stored in a portable terminal in a communication system according to an embodiment of the present invention.

(4) Method of Operating Client—Obtaining Portable Terminal Contents of Different User A process of sharing contents stored in a portable terminal is as illustrated in FIG. 3. FIG. 3 illustrates a process of sharing contents stored in a portable terminal in a communication system according to an embodiment of the present invention.

Referring to FIG. 3, in step 301, a user A 321 requests a middleware 330 to transmit contents stored in a portable terminal of a user B 322. In step 303, the middleware 330 transmits to the user B 322 a message for reporting generation of a request on the contents. There are two options for the message. That is, the message is either accepted or rejected. Accordingly, the user B 322 determines to accept or reject the message. It is assumed herein that the message is accepted. That is, in step 305, the user B 322 determines to accept the message.

In step 307, the portable terminal of the user B 322 transmits the stored contents to the middleware 330 together with an indication of accepting the message. The middleware 330 stores the contents into the database. In step 309, the middleware 330 transmits the contents to the user A 321.

Although not shown in FIG. 3, if the message is rejected in step 305, the user B 322 notifies the middleware 330 that the message is rejected, and the middleware 330 transmits a reject message to the user A 321.

Sharing contents according to an embodiment of the present invention will be described in detail from the perspective of a user interface.

FIG. 4 illustrates an example of a user interface for sharing contents in a communication system according to an embodiment of the present invention. In the interface of FIG. 4, a user 'Hong, Gil-dong' who is an uncle of a user 'Kim, Young-hee' requests contents of the user 'Kim, Young-hee'. It is assumed in the present invention that the users 'Hong, Gil-dong' and 'Kim, Young-hee' are registered to a middleware server.

Figure 4C:
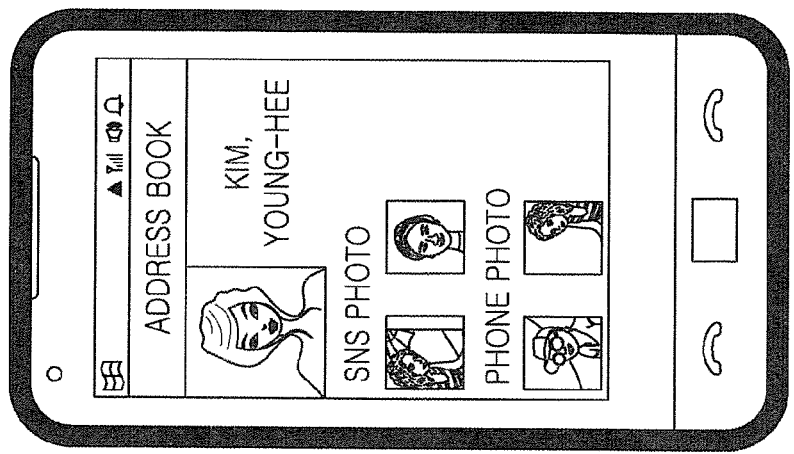
FIG. 4 illustrates an example of a user interface for sharing contents in a communication system according to an embodiment of the present invention.
Figure 4B:
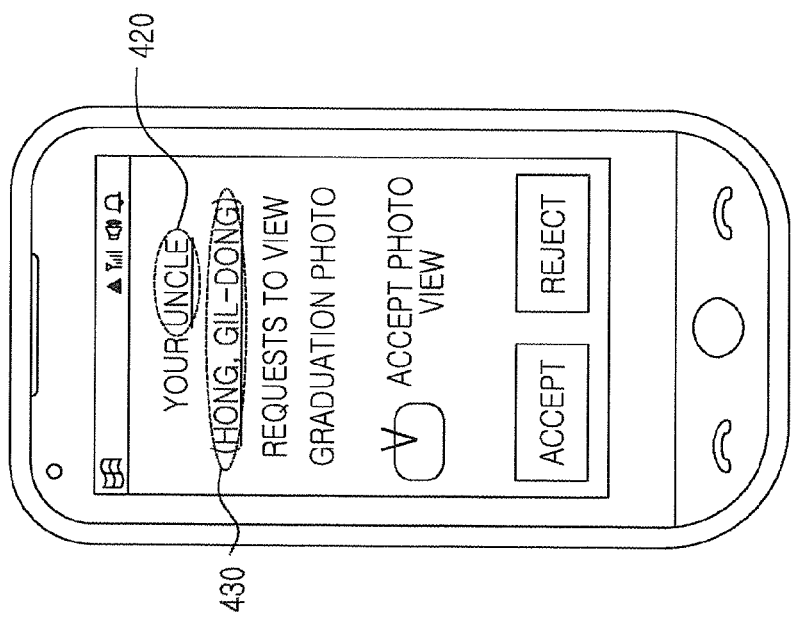
Figure 4A:
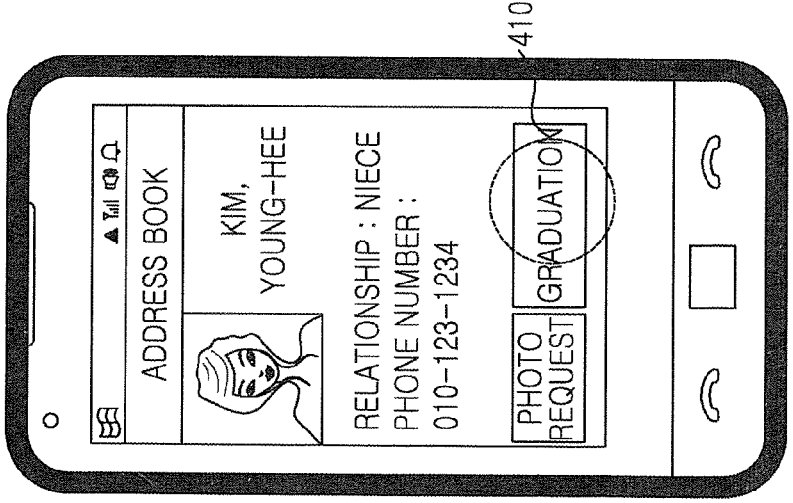

The user 'Hong, Gil-dong' operates a client, and selects the user 'Kim, Young-hee' from an address book of acquaintances. Accordingly, information on the user 'Kim, Young-hee' is displayed on a screen as illustrated in FIG. 4A. The user 'Hong, Gil-dong' inputs a tag 410 of 'graduation', and clicks a photo request button. A client of the user 'Hong, Gil-dong' transmits a message for requesting the contents to the middleware server. The middleware server notifies a request of reading the contents to a portable terminal of the user 'Kim, Young-hee'.

Because the client operates in the background, it can be notified in a format of an alarm message even if another operation is being performed in the portable terminal of the user 'Kim, Young-hee'. The portable terminal of the user 'Kim, Young-hee' searches a phone book to find requester's information, and as illustrated in FIG. 4B, displays an "uncle" 420 which is information of the requester, i.e., the user 'Hong, Gil-dong', a "graduation" 430 which is a tag of the requested contents, and contents lists. In this situation, the user 'Kim, Young-hee' selects a check box for inquiring about whether to view a photo which can be seen only by users with the first degree of kinship, and clicks an accept button. Accordingly, the portable terminal of the user 'Kim, Young-hee' transmits the accept message to the middleware server. In this situation, among contents tagged with "graduation", contents stored in the portable terminal of the user 'Kim, Young-hee' may be provided together.

Upon receiving the accept message, the middleware server collects contents of the user 'Kim, Young-hee' according to the embodiment of the present invention described above with reference to FIG. 2 and FIG. 3. That is, the middleware server collects the contents tagged with "graduation" by using an OAuth token of an SNS of the user 'Kim, Young-hee'. Furthermore, the middleware server collects the contents tagged with "graduation" among the contents stored in the portable terminal of the user 'Kim, Young-hee'. Furthermore, the middleware server transmits the collected contents to the portable terminal of the user 'Hong, Gil-dong'. Accordingly, the portable terminal of the user 'Hong, Gil-dong' displays the contents tagged with "graduation" of the user 'Kim, Young-hee' as illustrated in FIG. 4C.

Hereinafter, operations and structures of the portable terminal, the middleware server, and the SNS provider which are used to share contents as described above will be described in detail with reference to the accompanying drawings.

For convenience of explanation, it will be described in the present invention that 'contents uploaded to an SNS by a user' are referred to as 'SNS contents' and 'contents stored inside the portable terminal by the user' are referred to as 'internal contents'.

Figure 5:
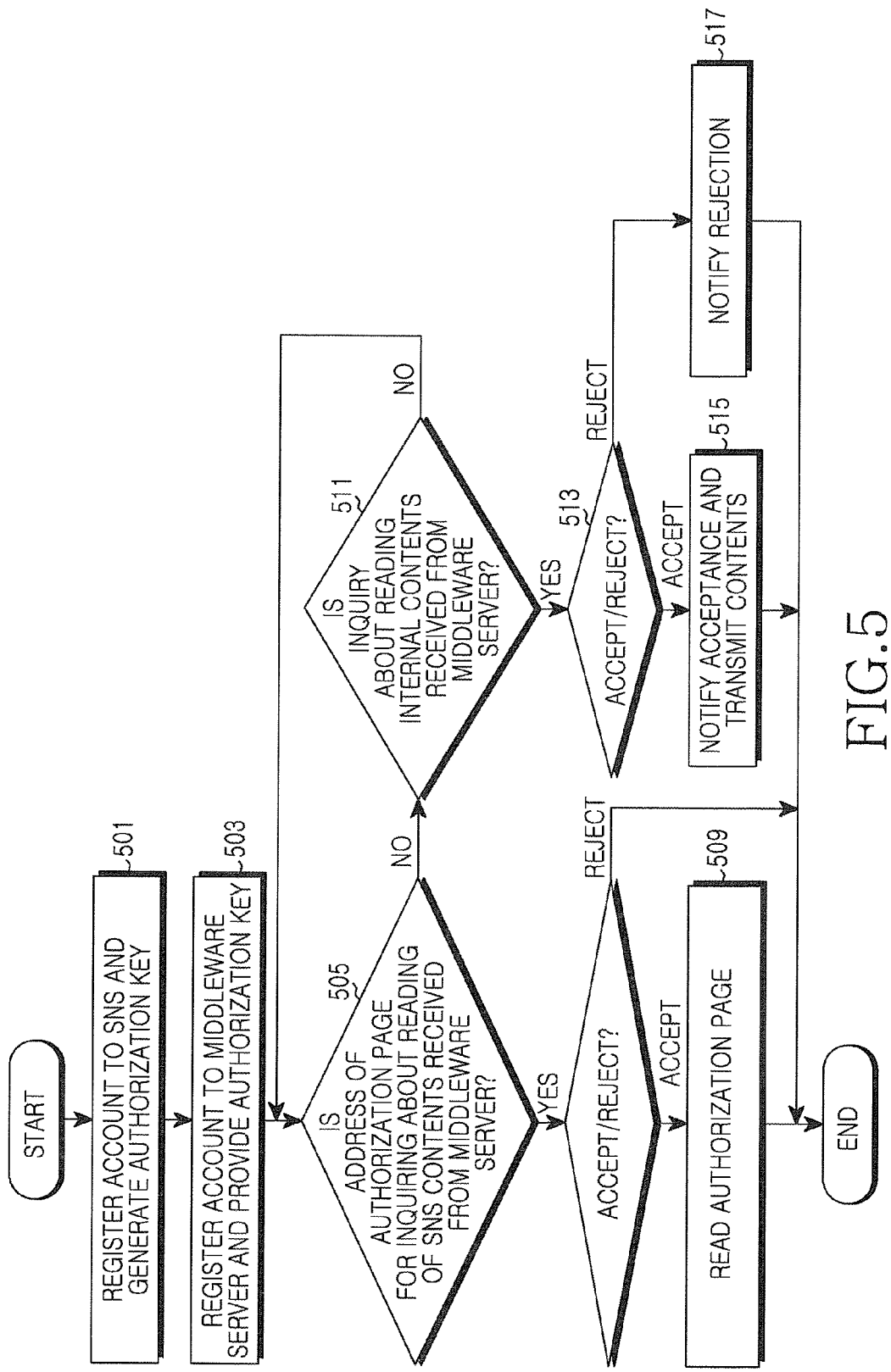
FIG. 5 illustrates a process of operating a portable terminal that provides contents in a communication system according to an embodiment of the present invention.

FIG. 5 illustrates a process of operating a portable terminal that provides contents in a communication system according to an embodiment of the present invention.

Referring to FIG. 5, the portable terminal registers an account to an SNS and generates an authorization key in step 501. The registering of the account to the SNS implies that the portable terminal is subscribed to the SNS by user's manipulation. The authorization key is generated by an open authorization protocol. For example, the open authorization key may be OAuth.

In step 503, the portable terminal registers the account to a middleware server, and provides the SNS and the generated authorization key to the middleware server. For example, if an account registration command is generated for the middleware server by the user, the portable terminal displays a screen for inputting an ID and a password, and registers the account to the middleware server by using the ID and password input by the user. Furthermore, to share SNS contents with other uses, the portable terminal provides the authorization key of the SNS to the middleware server.

In step 505, the portable terminal determines whether an address of an authorization page for inquiring about reading of the SNS contents is received from the middleware server. The authorization page is generated by the SNS provider when the reading of the contents is requested. An entity that provides the authorization page is the SNS provider.

Upon receiving the address of the authorization page, proceeding to step 507, the portable terminal determines whether the user determines to read the authorization page. That is, the portable terminal displays a screen for inquiring about the reading of the authorization page, and confirms the decision from the user. Reading the authorization page implies that reading of the SNS contents is accepted. That is, the portable terminal inquires about whether the request for reading the SNS contents is accepted. For example, the screen may include at least one of information on a requester who requests sharing of contents stored in a phone book of the user and a tag specified by the requester who requests the sharing of the contents. According to another embodiment of the present invention, the inquiry on whether to read the authorization page may be output by means of an audio unit or other equivalent units instead of a display unit.

When the request is accepted, proceeding to step 509, the portable terminal logs on to the SNS without user's manipulation, and reads the authorization page. That is, by reading the authorization page, the portable terminal reports to the SNS provider that the request of reading the SNS contents is accepted. Although not shown in FIG. 5, according to another embodiment of the present invention, if the request is rejected, the portable terminal may explicitly notify the SNS provider or the middleware server that the request of reading the SNS contents is rejected.

If an address of the authorization page for inquiring about reading the SNS contents is not received in step 505, proceeding to step 511, the portable terminal determines whether an inquiry about reading the internal contents is received from the middleware server. In other words, the portable terminal determines whether a message for requesting internal contents is received from the middleware server.

Upon receiving the inquiry about reading the internal contents, proceeding to step 513, the portable terminal determines whether the user determines to accept the reading of the internal contents. That is, the portable terminal displays a screen for inquiring about whether the reading of the internal contents is accepted, and determines the user's decision. For example, the screen may include at least one of information on the requester who requests sharing of the contents stored in the phone book of the user and a tag specified by the requester who requests the sharing of the contents. According to an embodiment of the present invention, the inquiry about whether to accept the reading of the internal contents may be output by means of the audio unit or other equivalent units instead of the display unit.

If the request is accepted, proceeding to step 515, the portable terminal notifies the middleware server that the request is granted, and transmits the requested contents. For example, if the requested contents are tagged with a specific word, the portable terminal searches for the contents from the stored contents, and provides the found contents. Otherwise, if the request is rejected, proceeding to step 517, the portable terminal notifies the middleware server that the reading is rejected.

In the embodiment of FIG. 5, the portable terminal distinguishes the request of sharing the SNS contents from the request of sharing the internal contents. However, according to an embodiment of the present invention, the request for sharing SNS contents and the request for sharing internal contents can be received concurrently. In this situation, the portable terminal can perform all of the step 507, the step 509, and the steps 513 to 517. In this situation, the step of confirming whether the user determines to accept/reject the request can be performed one time for both of the request for sharing the SNS contents and the request for sharing the internal contents.

Figure 6:
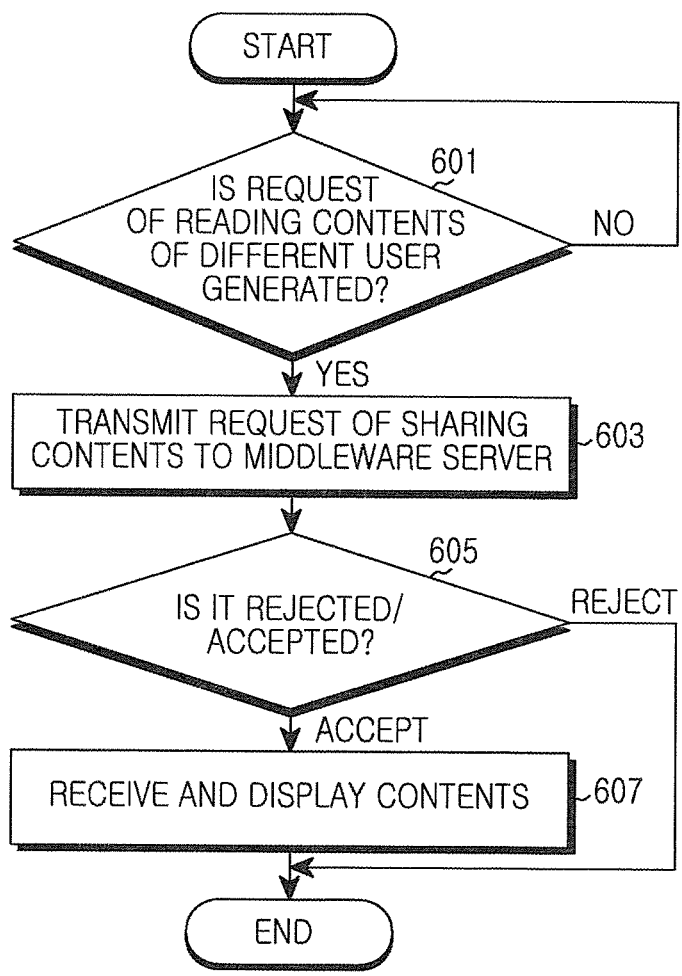
FIG. 6 is a flowchart of a portable terminal that receives contents in a communication system according to an embodiment of the present invention.

FIG. 6 illustrates a portable terminal that receives contents in a communication system according to an embodiment of the present invention.

Referring to FIG. 6, the portable terminal determines whether a user transmits a request to read contents of a different user in step 601. In other words, the portable terminal determines whether a command for requesting to read contents of the different user is generated by user's manipulation. In this situation, the contents include SNS contents and/or internal contents of the different user. For example, the user can input the command to the portable terminal through the screen of FIG. 4A.

If the request to read the contents of the different user is generated, proceeding to step 603, the portable terminal transmits the request of reading the contents to a middleware server. The request includes identification information of the different user. When the user inputs a specific word as a tag, the request may include the specific word. In addition, the request may include information that specifies the SNS contents and/or the internal contents.

In step 605, the portable terminal determines whether a reject/accept notification is received in response to the request of reading the contents. Upon receiving the reject notification, the portable terminal displays a screen for informing the user that the request is rejected, and then the procedure of FIG. 6 is terminated. According to an embodiment of the present invention, the rejection of the request may be represented by means of other than displaying, i.e., by means of an audio.

Otherwise, upon receiving the accept notification, proceeding to step 607, the portable terminal receives the requested contents from the middleware server, and displays a screen for showing the contents or a list of contents. In this situation, the portable terminal may display information on the different user together. For example, the portable terminal can display the screen of FIG. 4C.

Figure 7A:
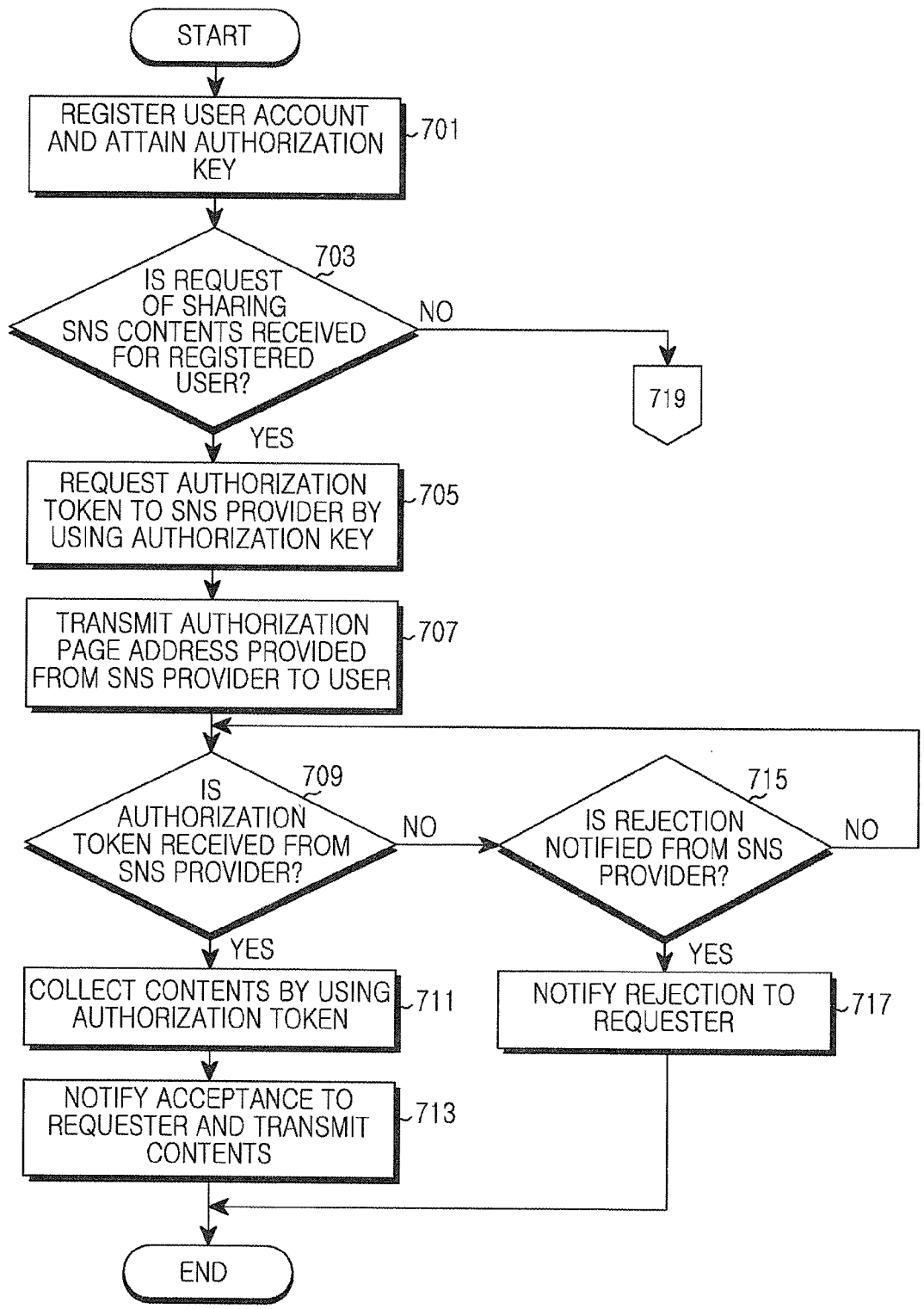
FIG. 7A and FIG. 7B illustrate an operation of a middleware server in a communication system according to an embodiment of the present invention.
Figure 7B:
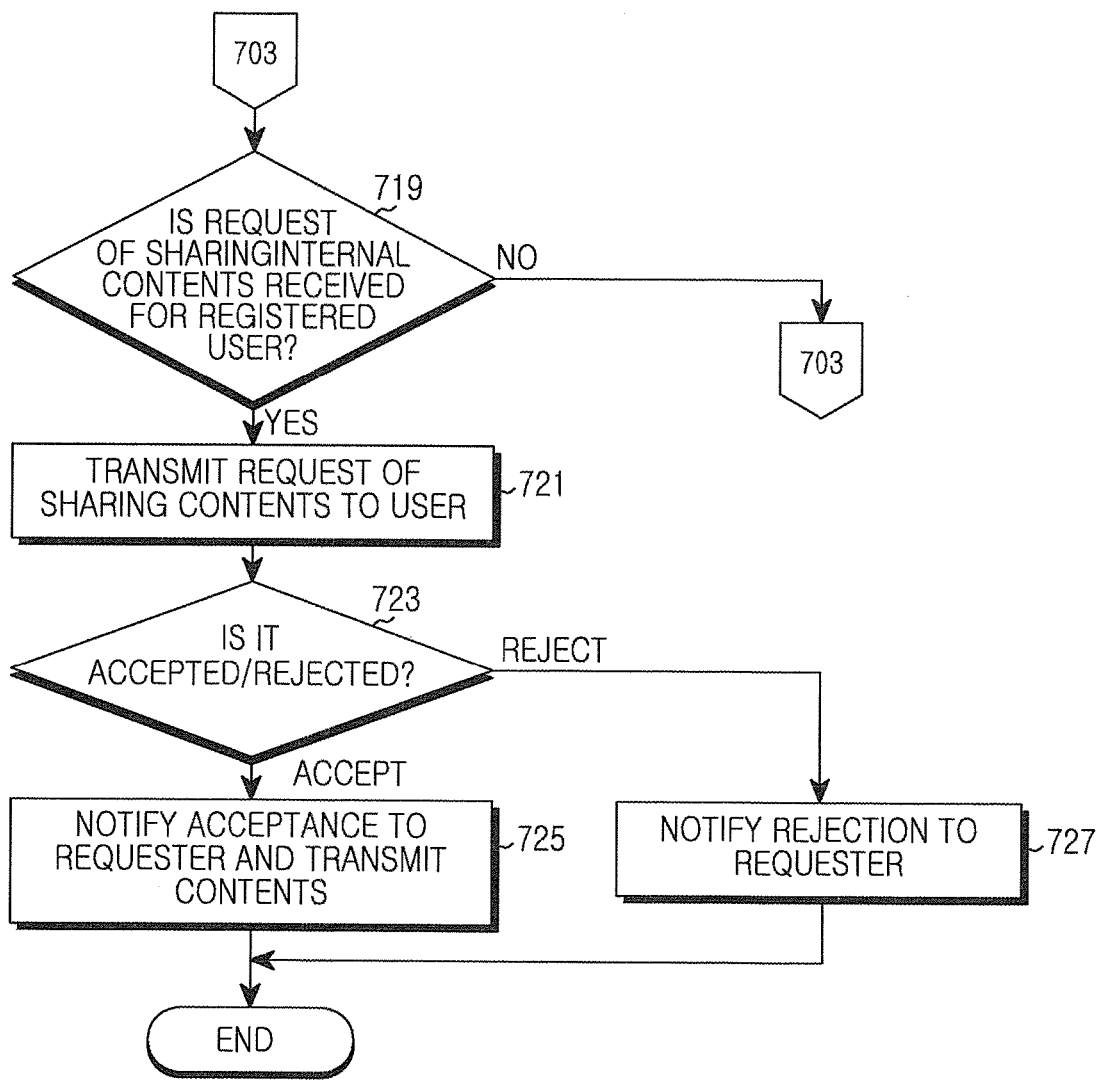

FIG. 7A and FIG. 7B illustrate an operation of a middleware server in a communication system according to an embodiment of the present invention.

Referring to FIG. 7A and FIG. 7B, the middleware server registers a user account in step 701, and obtains an authorization key of a user. That is, the middleware server registers an ID and password of the user at the request of the user, receives the authorization key for an SNS from the user, and stores the authorization key. The authorization key is generated by an open authorization protocol. For example, the open authorization key may be OAuth.

In step 703, the middleware server determines whether a request to share SNS contents of the registered user is received. Hereinafter, a user who has requested the sharing of the SNS contents is called a 'requester'.

Upon receiving the request to share the SNS contents, proceeding to step 705, the middleware server requests an SNS provider to transmit an authorization token by using the authorization key of the registered user. The authorization token is information that indicates an access right on protected data of a target user stored in the server provider. An authorization token may be set for all contents of the user or for each of the contents.

In step 707, the middleware server receives from the SNS provider an address of an authorization page to authorize sharing of the contents, and transmits the address of the authorization page to the user. The authorization page is generated by the SNS provider when the sharing of contents is requested. An entity that provides the authorization page is the SNS provider.

In step 709, the middleware server determines whether the authorization token is received from the SNS provider. Upon receiving the authorization token, proceeding to step 711, the middleware server collects contents of the user by using the authorization token. In other words, the middleware server transmits the authorization token to the SNS provider, requests the contents of the user, and receives the contents. In this situation, the SNS provider can store the contents. In step 713, the middleware server notifies the requester that the request to share the contents is accepted, and transmits the collected contents.

If the authorization token is not received in step 709, proceeding to step 715, the middleware server determines whether the notification shows that the request on the authorization token is rejected. If the notification shows that the request of the authorization token is rejected, proceeding to step 717, the middleware server notifies the requester that the request of sharing the contents is rejected.

If the request of sharing the SNS contents is not received in step 703, proceeding to step 719, the middleware server determines whether a request of sharing internal contents of the registered user is received.

If the request to share the internal contents is received, proceeding to step 721, the middleware server transmits the request to share the contents to the user. The sharing request includes identification information of the requester.

In step 723, the middleware server determines whether an accept/reject notification is received from the user. In this situation, upon receiving the accept notification, the contents can be received together from the user. Upon receiving the accept notification, proceeding to step 725, the middleware server notifies the requester that the request of sharing the contents is accepted, and transmits the requested contents. Otherwise, upon receiving the reject notification, proceeding to step 727, the middleware server notifies the requester that the request to share the contents is rejected.

In the embodiment of FIG. 7A and FIG. 7B, the middleware server distinguishes the request to share the SNS contents from the request to share the internal contents. However, according to another embodiment of the present invention, the request of sharing the SNS contents and the request of sharing the internal contents can be generated concurrently. In this situation, the middleware server can perform the steps 705 to 713 and the steps 721 to 727.

Figure 8:
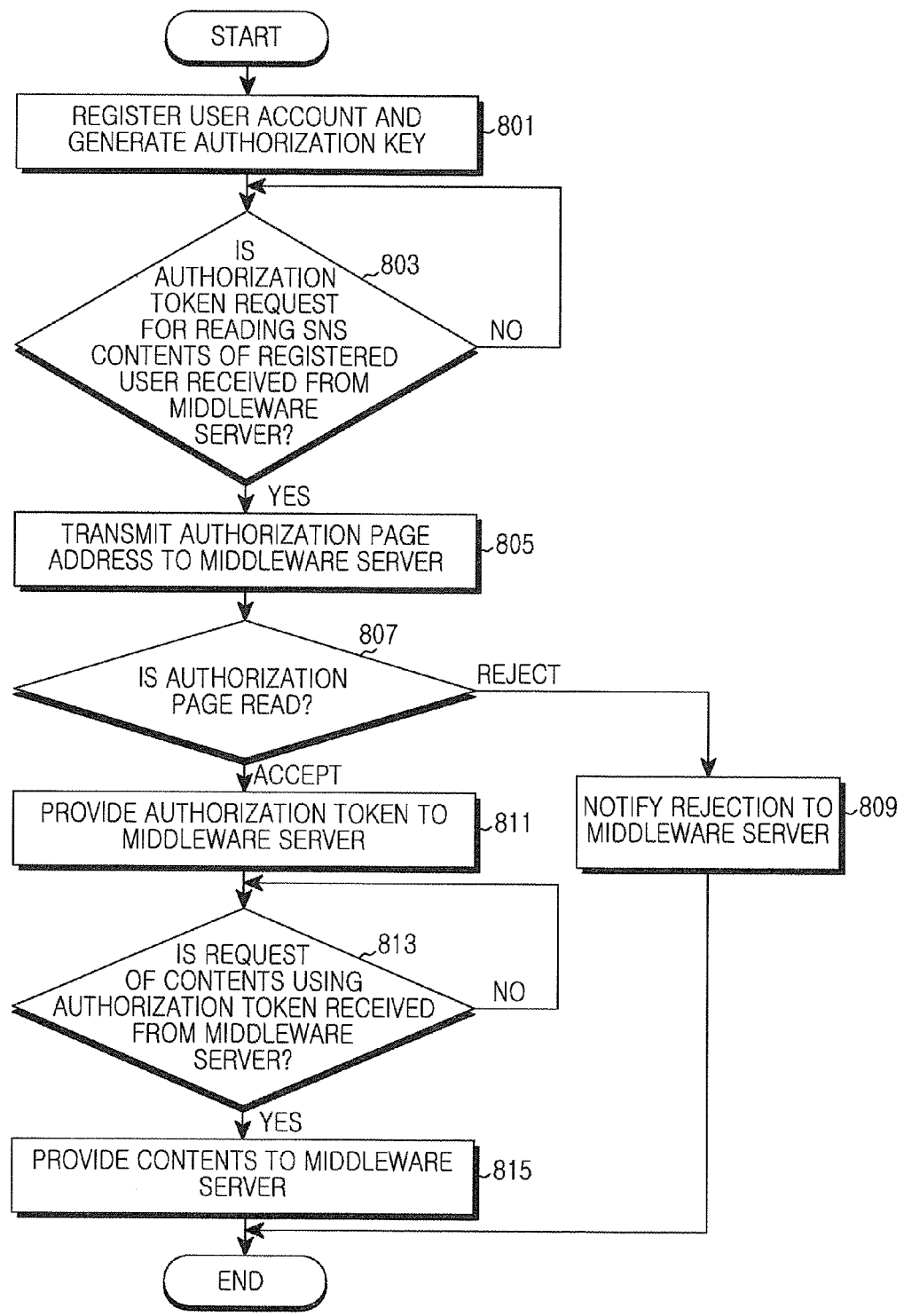
FIG. 8 illustrates a process of operating a Social Network Service (SNS) provider in a communication system according to an embodiment of the present invention.

FIG. 8 illustrates a process of operating an SNS provider in a communication system according to an embodiment of the present invention.

Referring to FIG. 8, the SNS provider registers a user account and generates an authorization key in step 801. Registering the account implies that the user is subscribed to an SNS. The authorization key is generated by an open authorization protocol. For example, the open authorization key may be OAuth.

In step 803, the SNS provider determines whether a request of the authorization token is received from a middleware server. The authorization token is for reading the SNS contents of the registered user. Herein, the request of the authorization token is received together with the authorization key of the user.

Upon receiving the request of the authorization token, proceeding to step 805, the SNS server transmits an address of an authorization page to the middleware server. That is, the SNS provider generates the authorization page for determining whether the user accepts the sharing of the SNS contents, and provides the address of the authorization page to the middleware server.

In step 807, the SNS provider determines whether the authorization page is read by the user. The reading of the authorization page implies that the user accepts the sharing of the SNS contents.

If the authorization page is not read, proceeding to step 809, the SNS provider notifies the middleware sever that the sharing of the SNS contents is rejected. Otherwise, if the authorization page is read, proceeding to step 811, the SNS provider provides the authorization token to the middleware server.

In step 813, the SNS provider determines whether a request of contents using the authorization token is received from the middleware server. In other words, the SNS provider determines whether the middleware server transmits the authorization token and requests the reading of contents. Upon receiving the request of contents using the authorization token, proceeding to step 815, the SNS provider provides the requested contents to the middleware server.

Figure 9:
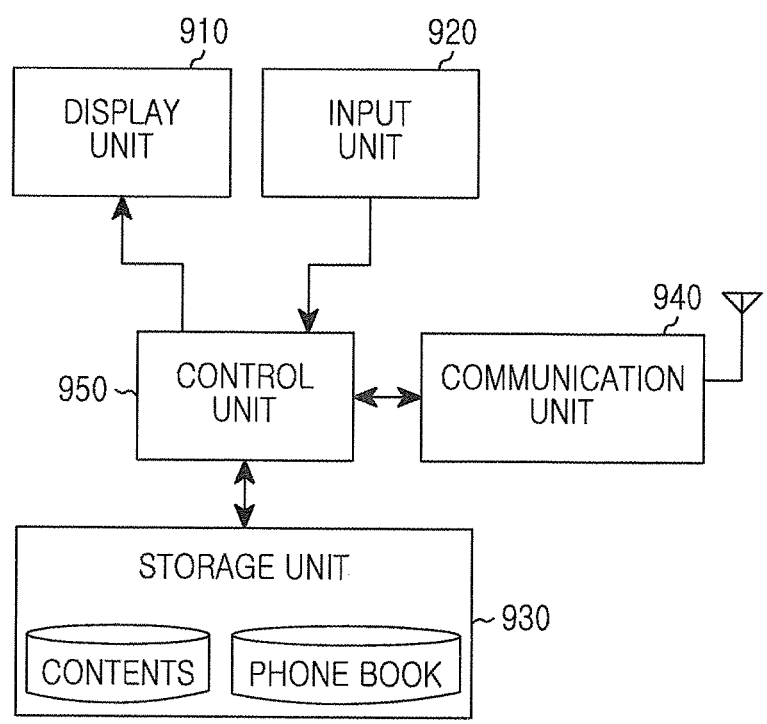
FIG. 9 is a block diagram of a portable terminal in a communication system according to an embodiment of the present invention.

FIG. 9 is a block diagram of a portable terminal in a communication system according to an embodiment of the present invention.

Referring to FIG. 9, the portable terminal includes a display unit 910, an input unit 920, a storage unit 930, a communication unit 940, and a control unit 950.

The display unit 910 displays status information, which is generated while the terminal operates, and alphanumeric characters, images, and such, produced as an application program is executed. That is, the display unit 910 displays image data provided from the control unit 950 on a visual screen. For example, the display unit 910 may be a Liquid Crystal Display (LCD), an Organic Light-Emitting Diode (OLED), and such.

The input unit 920 recognizes an input generated by the user, and provides information corresponding to the input to the controller unit 950. That is, the input unit 920 processes the user's input by means of a keyboard, a keypad, a touch screen, a touch pad, a mouse, a special function button, and such.

The storage unit 930 stores data such as a basic program for operating the portable terminal, an application program, and user contents, phone books, and such. Further, the storage unit 930 provides the stored data at the request of the control unit 950.

The communication unit 940 provides an interface for signal transmission and reception through a radio channel. That is, the communication unit 940 transmits Transmit (Tx) data by converting the data into a Radio Frequency (RF) signal, and converts the RF signal received through the antenna into Receive (Rx) data. In this situation, the communication unit 940 performs conversion between the data and the RF signal according to a communication system protocol.

The control unit 950 provides overall control to the portable terminal. For example, the control unit 950 provides image data to the display unit 910, and performs processing corresponding to user's manipulation recognized via the input unit 920. In particular, according to the embodiment of the present invention, the control unit 950 controls functions for sharing SNS contents and internal contents. For example, the portable terminal operates as illustrated in FIG. 5 or FIG. 6 under the control of the control unit 950. An operation of the control unit 950 for sharing the SNS contents and the internal contents is as follows.

When subscribed to the SNS, the control unit 950 registers an account to the SNS, and generates an authorization key. Further, the control unit 950 registers the account to the middleware server, and provides the SNS and the generated authorization key to the middleware server.

If the SNS contents are provided, the control unit 950 determines whether an address of an authorization page is received from the middleware server. The authorization page is for inquiring about whether to read the SNS contents. Upon receiving the authorization page address, the control unit 950 allows the display unit 910 to display a screen for inquiring about whether to read the authorization page, and confirms the result of determination of the user via the input unit 920. If it is determined to read the authorization page, the control unit 950 logs on to the SNS without user's manipulation, and reads the authorization page.

If the internal contents are provided, upon receiving the inquiry about reading the internal contents from the middleware server, the control unit 950 allows the display unit 910 to display a screen for inquiring about whether to accept the reading of the internal contents, and confirms the user's decision via the input unit 920. If the request is accepted, the control unit 950 notifies the middleware server that the reading is accepted via the communication unit 940, loads the requested contents from the storage unit 930, and transmits the contents.

If contents are requested, the control unit 950 determines whether the user commands to read contents of a different user via the input unit 920. When the reading of the contents of the different user is commanded, the control unit 950 transmits a request of reading the contents to the middleware server via the communication unit 940, and determines an accept/reject notification received from the middleware server. If the accept notification is received, the control unit 950 receives the requested contents from the middleware server, and allows the display unit 910 to display a screen for showing the contents or a list of the contents.

Figure 10:
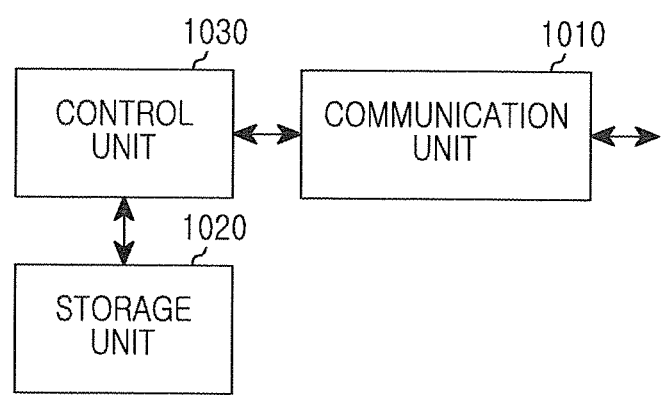
FIG. 10 is a block diagram of a server apparatus in a communication system according to an embodiment of the present invention.

FIG. 10 is a block diagram of a server apparatus in a communication system according to an embodiment of the present invention. The server apparatus of FIG. 10 is applicable to the middleware server and/or the SNS provider.

Referring to FIG. 10, the server apparatus includes a communication unit 1010, a storage unit 1020, and a control unit 1030.

The communication unit 1010 provides an interface for signal transmission and reception through a channel. That is, the communication unit 1010 transmits Tx data by converting it into a physical signal, and converts a received physical signal into Rx data. In this situation, the communication unit 1010 performs conversion between data and signals according to a communication system protocol.

The storage unit 1020 stores data such as a basic program for operating the server apparatus, an application program, and such. Furthermore, the storage unit 1020 provides the stored data at the request of the control unit 1030. If the server apparatus is the middleware server, the storage unit 1020 can store information on registered users, OAuth key information of the users, and such. If the server apparatus is the SNS provider, the storage unit 1020 can store SNS contents of the users, OAuth key information of the users, OAuth token information of the users, and such.

The control unit 1030 controls overall functions of the portable terminal. In particular, according to the embodiment of the present invention, the control unit 1030 controls functions for sharing SNS contents or internal contents of users. For examples, if the server apparatus is the middleware server, the server apparatus operates as illustrated in FIG. 7A and FIG. 7B under the control of the control unit 1030. If the server apparatus is the SNS provider, the server apparatus operates as illustrated in FIG. 8 under the control of the control unit 1030. To share the SNS contents or the internal contents, the control unit 1030 operates as follows.

If the server apparatus is the middleware server, the control unit 1030 operates as follows. The control unit 1030 obtains an authorization key of the user when a user account is registered, and stores the authorization key into the storage unit 1020. Upon receiving a request of sharing the SNS contents of the user from a requester, the control unit 1030 requests the SNS provider to transmit an authorization token by using the authorization key of the user via the communication unit 1010, and transmits an address of an authorization page to the user. The authorization page is used to authorize sharing of contents received from the SNS provider. Upon receiving the authorization token from the SNS provider, the control unit 1030 transmits the authorization token to the SNS provider and requests the contents of the user. After receiving the contents, the control unit 1030 notifies the requester that the request to share the contents is accepted, and transmits the contents. Upon receiving the request of sharing internal contents of the user from the requester, the control unit 1030 transmits the request of sharing the contents to the user, and determines an accept/reject notification transmitted from the user. Upon receiving the accept notification, the control unit 1030 notifies the requester that the request of sharing the contents is accepted, and transmits the requested contents.

If the server apparatus is the SNS provider, the control unit 1030 operates as follows. The control unit 1030 generates an authorization key when the user account is registered, and shares the authorization key with the user. Thereafter, if an authorization token for reading the contents is requested from the middleware server together with the authorization key, the control unit 1030 generates an authorization page, and transmits an address of the authorization page to the middleware server via the communication unit 1010. When the authorization page is read by the user, the control unit 1030 generates the authorization token for the reading of the contents, and provides the authorization token to the middleware server. Thereafter, when the contents are requested from the middleware server together with the authorization token, the control unit 1030 searches the storage unit 1020 to find the contents and provides the found contents to the middleware server.

According to embodiments of the present invention, a portable terminal receives contents stored in another portable terminal of a different user via a middleware server, and thus there is an advantage as if the contents of the portable terminal are directly read. In addition, even if Social Network Service (SNS) account information of the different user is not known, SNS contents of the different user can be read through indirect authorization by using Open Authorization (OAuth).

What is claimed is:

1. A communication system for supporting a Social Network Service (SNS), the system comprising:
   an SNS server configured to:
      provide the SNS to a first SNS subscriber and a second SNS subscriber, both SNS subscribers subscribing to the SNS from the SNS server respectively, where the first SNS subscriber has no SNS connection for providing accessibility to content of the second SNS subscriber with the second SNS subscriber;
      generate an authorization key and an authorization token according to an open authorization protocol for the second SNS subscriber of the SNS;
      receive a request for accessing the SNS content of the second SNS subscriber from the first SNS subscriber; and
      inquire the second SNS subscriber whether to approve the request by using the authorization key of the second SNS subscriber; and
   a middleware server configured to:
      in response to the SNS server receiving the authorization key from the second SNS subscriber:
         obtain the SNS content of the second SNS subscriber from the SNS server by using an authorization key of the second SNS subscriber; and
         transmit the SNS content of the second SNS subscriber to the first SNS subscriber.

2. The system of claim 1, wherein the SNS server is further configured to generate the authorization key of the second SNS subscriber when the second SNS subscriber registers an account for the SNS.

3. The system of claim 1, wherein the middleware server is further configured to receive the authorization key from the second SNS subscriber when the second SNS subscriber registers an account to the middleware server.

4. The system of claim 1, wherein the middleware server is further configured to provide the authorization key of the second SNS subscriber to the SNS server, request an authorization token for reading the content of the second SNS subscriber, and when the authorization token is provided, collect the content of the second SNS subscriber by using the authorization token for reading the content of the second SNS subscriber.

5. The system of claim 4, wherein after the authorization token for reading the content of the second SNS subscriber is requested, the middleware server is further configured to transmit an address of an authorization page to the second SNS subscriber upon receiving the address of the authorization page from the SNS server.

6. The system of claim 5, wherein the SNS server is further configured to provide the authorization token for reading the content of the second SNS subscriber to the middleware server when the second SNS subscriber reads the authorization page.

7. The system of claim 1, wherein when a third subscriber of the SNS requests sharing content of the second SNS subscriber, the middleware server is further configured to inquire the second SNS subscriber about whether sharing of internal content with the third SNS subscriber is approved, and if an acceptance is received from the second SNS subscriber to share the content of the second SNS subscriber, transmit the content to the third SNS subscriber.

8. A method for operating a middleware server in a communication system supporting a Social Network Service (SNS), the method comprising:
determining an authorization key for a second SNS subscriber of the SNS according to an open authorization protocol when a request to share SNS content of the second SNS subscriber is received from a first SNS subscriber of the SNS by an SNS server configured to provide the SNS to a first SNS subscriber and a second SNS subscriber, both SNS subscribers subscribing to the SNS from the SNS server respectively, wherein the first SNS subscriber has no connection for providing accessibility to content of the second SNS subscriber with the second SNS subscriber;
in response to the SNS server receiving the authorization key from the second SNS subscriber, obtaining the content of the second SNS subscriber from the SNS server by using the authorization key of the second SNS subscriber; and
transmitting the content of the second SNS subscriber to the first SNS subscriber,
wherein the SNS server is configured to generate an authorization key and an authorization token according to the open authorization protocol, receive a request for accessing the SNS content of the second SNS subscriber from the first SNS subscriber and inquire the second SNS subscriber whether to approve the request by using the authorization key of the second SNS subscriber.

9. The method of claim 8, further comprising receiving the authorization key from the second SNS subscriber when the second SNS subscriber registers an account to the middleware server.

10. The method of claim 8, wherein obtaining the content of the second SNS subscriber from the SNS server by using the authorization key of the second SNS subscriber comprises:
providing the authorization key of the second SNS subscriber to the SNS server;
requesting an authorization token for reading the content of the second SNS subscriber; and
collecting the content of the second SNS subscriber by using the authorization token when the authorization token is received.

11. The method of claim 10, wherein obtaining the content of the second SNS subscriber from the SNS server by using the authorization key of the second SNS subscriber comprises, after requesting the authorization token for reading the content of the second SNS subscriber, transmitting to the second SNS subscriber an address of an authorization page when the address of the authorization page is received from the SNS server.

12. The method of claim 8, further comprising:
when a third SNS subscriber request to share internal content of the second SNS subscriber is received, inquiring the second SNS subscriber about whether sharing the internal content is approved; and
when the internal content is provided from the second SNS subscriber, transmitting the internal content to the third SNS subscriber.

13. A method of operating a Social Network Service (SNS) server in a communication system, the method comprising:
providing the SNS to a first SNS subscriber and a second SNS subscriber, both subscribers subscribing to the SNS from the SNS server respectively, where the first SNS subscriber has no connection for providing accessibility to content of the second SNS subscriber with the second SNS subscriber;
generating an authorization key for a second SNS subscriber of the SNS according to an open authorization protocol when registering a subscriber account;
receiving a request for accessing the SNS content of the second SNS subscriber from the first SNS subscriber;
inquiring the second SNS subscriber whether to approve the request by using the authorization key of the second SNS subscriber; and
providing the SNS content of the first SNS subscriber to a middleware server that is configured to, in response to the SNS server receiving the authorization key from the second SNS subscriber, obtain SNS content of the second SNS subscriber from the SNS server by using an authorization key of the second SNS subscriber and transmit the SNS content of the second SNS subscriber to the first SNS subscriber.

14. The method of claim 13, wherein providing the authorization token comprises:
generating an authorization page when the request for the authorization token is received;
providing an address of the authorization page to the middleware server; and
providing the authorization token to the middleware server when the second SNS subscriber reads the authorization page.

15. A method of operating a portable terminal in a communication system supporting a Social Network Service (SNS), the method comprising:
generating an authorization key of a second SNS subscriber of the SNS according to an open authorization protocol when an account for the second SNS subscriber is registered to the SNS;
providing the authorization key of the second SNS subscriber to a middleware server configured to, in response to the SNS server receiving the authorization key from the second SNS subscriber, obtain SNS content of the second SNS subscriber from the SNS server by using an authorization key of the second SNS subscriber, and transmit the SNS content of the second SNS subscriber to the first SNS subscriber; and
when a request to share SNS content of the second SNS subscriber is received from a first SNS subscriber of the SNS, wherein the first SNS subscriber has no connection for providing accessibility to content of the second SNS subscriber with the second SNS subscriber, displaying a screen for inquiring the second SNS subscriber about whether the sharing of the content is approved,
wherein the SNS server is configured to provide the SNS to a first SNS subscriber and a second SNS subscriber, both SNS subscribers subscribing to the SNS from the SNS server respectively, receive a request for accessing the SNS content of the second SNS subscriber from the first SNS subscriber, and inquire the second SNS subscriber whether to approve the request by using an authorization key of the second SNS subscriber.

16. The method of claim 15, wherein the screen for inquiring about whether the sharing of the content is approved comprises at least one of information stored in a phone book regarding a requester who requests the sharing of the content and a tag specified by the requester.

17. The method of claim 15, wherein the screen for inquiring about whether the sharing of the content is approved comprises an inquiry about whether to read an authorization page generated by the SNS server.

18. The method of claim 17, further comprising reading the authorization page when an acceptance to share the content of the second SNS subscriber is received.

19. A middleware server apparatus in a communication system supporting a Social Network Service (SNS), the apparatus comprising:
   a controller configured to, in response to an SNS server receiving an authorization key from a second SNS subscriber, obtain the content of the second SNS subscriber from an SNS server by using the authorization key of the second SNS subscriber, wherein the first SNS subscriber has no connection for providing accessibility to content of the second SNS subscriber with the second SNS subscriber; and
   a communication unit configured to transmit the content of the second SNS subscriber to the first SNS subscriber,
   wherein the SNS server is configured to provide the SNS to the first SNS subscriber and the second SNS subscriber, both subscribers subscribing to the SNS from the SNS server respectively, generate an authorization key and an authorization token according to the open authorization protocol, receive a request for accessing the SNS content of the second SNS subscriber from the first SNS subscriber, and inquire the second SNS subscriber whether to approve the request by using the authorization key of the second SNS subscriber.

20. The apparatus of claim 19, wherein the controller is further configured to receive the authorization key from the second SNS subscriber when the second SNS subscriber registers an account to the middleware server.

21. The apparatus of claim 19, wherein the controller is further configured to provide the authorization key of the second SNS subscriber to the SNS server, request an authorization token for reading the content of the second SNS subscriber, and collect the content of the second SNS subscriber by using the authorization token when the authorization token is received.

22. The apparatus of claim 21, wherein after requesting the authorization token for reading the contends of the second SNS subscriber, the controller is further configured to transmit to the second SNS subscriber an address of an authorization page when the address of the authorization page is received from the SNS server.

23. The apparatus of claim 19, wherein when a third of the SNS request to share internal content of the second SNS subscriber is received, the controller is further configured to inquire the second SNS subscriber about whether sharing the internal content is approved, and transmit the internal content to the third SNS subscriber when the internal content is provided from the second SNS subscriber.

24. A Social Network Service (SNS) server apparatus in a communication system supporting an SNS, the apparatus comprising:
   a controller configured to provide the SNS to a first SNS subscriber and a second SNS subscriber, both subscribers subscribing to the SNS from the SNS server respectively, where the first SNS subscriber has no connection for providing accessibility to content of the second SNS subscriber with the second SNS subscriber, and generate an authorization key for a second SNS subscriber of the SNS according to an open authorization protocol when registering a subscriber account; and
   a communication unit configured to provide the authorization token for reading SNS content of the second SNS subscriber when a request for the authorization token comprising the authorization key of the second SNS subscriber is received from a middleware server, and provide the SNS content of the second SNS subscriber when a request to read the SNS content of the second SNS subscriber comprising the authorization token is received,
   wherein the communication unit is further configured to receive a request for accessing the SNS content of the second SNS subscriber from a first SNS subscriber of the SNS, and inquire the second SNS subscriber whether to approve the request by using the authorization key of the second SNS subscriber, wherein the first SNS subscriber has no connection with the second SNS subscriber, the connection providing accessibility to the content of the second SNS subscriber.

25. The apparatus of claim 24, wherein the controller is further configured to generate an authorization page when the request for the authorization token is received, provide an address of the authorization page to the middleware server, and provide the authorization token to the middleware server when the second SNS subscriber reads the authorization page.

26. A portable terminal apparatus in a communication system supporting a Social Network Service (SNS), the apparatus comprising:
   a controller configured to generate an authorization key of a second SNS subscriber of the SNS according to an open authorization protocol when an account for the second SNS subscriber is registered to the SNS;
   a communication unit configured to provide the authorization key of the second SNS subscriber to a middleware server configured to, in response to the SNS server receiving the authorization key from the second SNS subscriber, obtain SNS content of the second SNS subscriber from the SNS server by using an authorization key of the second SNS subscriber, and transmit the SNS content of the second SNS subscriber to a first SNS subscriber; and
   a display unit configured to display a screen for inquiring the second SNS subscriber about whether sharing of SNS content of the second SNS subscriber is approved when a request to share the SNS content of the SNS subscriber is received,
   wherein the SNS server is configured to provide the SNS to the first SNS subscriber and the second SNS subscriber, both subscribers subscribing to the SNS from the SNS server respectively, where the first SNS subscriber has no connection for providing accessibility to content of the second SNS subscriber with the second SNS subscriber, receive a request for accessing the SNS content of the second SNS subscriber from a first SNS subscriber of the SNS, and inquire the second SNS subscriber whether to approve the request by using the authorization key of the second SNS subscriber.

27. The apparatus of claim 26, wherein the screen for inquiring about whether the sharing of the content is approved comprises at least one of information stored in a phone book regarding a requester who requests the sharing of the content and a tag specified by the requester.

28. The apparatus of claim 26, wherein the screen for inquiring about whether the sharing of the content is approved comprises an inquiry about whether to read an authorization page generated by an SNS server.

29. The apparatus of claim 28, wherein the controller is further configured to read the authorization page when an acceptance to share the content of the SNS subscriber is received.

* * * * *